US010696828B2

(12) United States Patent
Wang et al.

(10) Patent No.: US 10,696,828 B2
(45) Date of Patent: Jun. 30, 2020

(54) ETHYLENE/ALPHA-OLEFIN COPOLYMER COMPOSITION, AND ARTICLES COMPRISING THE SAME

(71) Applicant: Dow Global Technologies LLC, Midland, MI (US)

(72) Inventors: Jian Wang, Sugar Land, TX (US); Mridula Kapur, Lake Jackson, TX (US); Mehmet Demirors, Pearland, TX (US); Douglas S. Ginger, Houston, TX (US); Philip P. Fontaine, Pearland, TX (US); Amaia Bastero, Tarragona (ES); David Lopez, Tarragona (ES)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/066,895

(22) PCT Filed: Feb. 22, 2017

(86) PCT No.: PCT/US2017/018820
§ 371 (c)(1),
(2) Date: Jun. 28, 2018

(87) PCT Pub. No.: WO2017/151358
PCT Pub. Date: Sep. 8, 2017

(65) Prior Publication Data
US 2019/0023883 A1 Jan. 24, 2019

(30) Foreign Application Priority Data

Mar. 2, 2016 (EP) ..................................... 16382091

(51) Int. Cl.
*C08L 23/08* (2006.01)
*C08F 210/16* (2006.01)

(52) U.S. Cl.
CPC ........ C08L 23/0815 (2013.01); C08F 210/16 (2013.01); *C08F 2500/01* (2013.01); *C08F 2500/04* (2013.01); *C08F 2500/07* (2013.01); *C08F 2500/11* (2013.01); *C08F 2500/17* (2013.01); *C08F 2500/19* (2013.01); *C08L 2203/18* (2013.01); *C08L 2205/025* (2013.01); *C08L 2205/06* (2013.01)

(58) Field of Classification Search
CPC .................................................. C08L 23/0815
See application file for complete search history.

(56) References Cited

U.S. PATENT DOCUMENTS

| | | |
|---|---|---|
| 5,064,802 A | 11/1991 | Stevens et al. |
| 5,153,157 A | 10/1992 | Hlatky et al. |
| 5,296,433 A | 3/1994 | Siedle et al. |
| 5,321,106 A | 6/1994 | LaPointe |
| 5,350,723 A | 9/1994 | Neithamer et al. |
| 5,425,872 A | 6/1995 | Devore et al. |
| 5,625,087 A | 4/1997 | Devore et al. |
| 5,721,185 A | 2/1998 | LaPointe et al. |
| 5,783,512 A | 7/1998 | Jacobsen et al. |
| 5,883,204 A | 3/1999 | Spencer et al. |
| 5,919,983 A | 7/1999 | Rosen et al. |
| 6,103,657 A | 8/2000 | Murray |
| 6,515,155 B1 | 2/2003 | Klosin et al. |
| 6,696,379 B1 | 2/2004 | Carnahan et al. |
| 7,163,907 B1 | 1/2007 | Canich et al. |
| 7,250,473 B2 | 7/2007 | Schramm et al. |
| 7,411,023 B2 | 8/2008 | Palmlof |
| 8,344,068 B2 * | 1/2013 | Michie, Jr. ........... C08L 23/0815 525/191 |
| 8,530,580 B2 | 9/2013 | Backman et al. |
| 9,102,819 B2 | 8/2015 | Kapur et al. |
| 9,115,275 B2 | 8/2015 | Kupar et al. |
| 9,631,059 B2 | 4/2017 | Demirors et al. |
| 9,834,712 B2 | 12/2017 | Kapur et al. |
| 9,884,929 B2 | 2/2018 | Wang et al. |
| 2006/0036041 A1 | 2/2006 | Kwalk |
| 2006/0079656 A1 | 4/2006 | DesLauriers et al. |
| 2010/0029883 A1 | 2/2010 | Krajete et al. |

FOREIGN PATENT DOCUMENTS

WO    WO-2014179296 A1 *  11/2014   ............ C08F 210/16

OTHER PUBLICATIONS

Karjala, Teresa P. et al., "Detection of low levels of long-chain branching in polyolefins" Annual Technical Conference—Society of Plastics Engineers (2008), 66th 887-891.
T. Williams and I.M. Ward, "The Construction of a Polyethylene Calibration Curve for Gel Permeation Chromatography using Polystyrene Fractions", Polymer. Letters, 6, 621-624 1968.
14382547.9, European Search Report and dated Jun. 11, 2015.
16382091.3, European Search Report and dated Apr. 25, 2016.
PCT/US2017/018820, International Search Report and Written Opinion dated May 3, 2017.
PCT/US2017/018820, International Preliminary Report on Patentability dated Sep. 4, 2018.

* cited by examiner

Primary Examiner — Wenwen Cai

(57) ABSTRACT

An ethylene/alpha-olefin copolymer composition having a density from 0.935 to 0.955 g/cc; a ratio of weight average molecular weight to number average molecular weight, Mw/Mn, of from 3 to 10; a z-average molecular weight, Mz, from 200 kg/mol to 500 kg/mol; and a PENT value of greater than 500 hours at 80° C. and 2.4 MPa; wherein when the composition is formed into a monolayer pipe the pipe has a pipe hydrostatic strength of greater than 100 hours at 20° C. and 12.0 MPa. Also provided is a pipe or pipe fitting comprising the ethylene/alpha-olefin copolymer composition.

13 Claims, No Drawings

ETHYLENE/ALPHA-OLEFIN COPOLYMER COMPOSITION, AND ARTICLES COMPRISING THE SAME

TECHNICAL FIELD

The disclosure relates to ethylene/alpha-olefin copolymer compositions and articles comprising the same.

BACKGROUND

Potentially disastrous consequences can occur when pipes used for water or gas distribution experience a material failure. These pipes are generally subject to product standards and performance requirements set forth in norms such as, for example, DIN (German Industrial Norm or "Deutsche Industrie Norm") or norms defined by ISO (International Organization for Standardization, Geneva, Switzerland). Pipes made from polyethylene may also need to meet the so-called PE80 or PE100 ratings (PE stands for polyethylene), which include the ability to withstand a minimum hydrostatic strength of 8 MPa (PE80) or 10 MPa (PE100) at 20° C. for 50 years.

Use of polyethylene resins in pipe applications is not without its disadvantages. Polyethylene resins can have relatively poor long term hydrostatic strength (LTHS) at high temperatures, which can render these materials unsuitable for use in piping that may be exposed to higher temperatures, such as, domestic or industry pipe systems. Other materials often used in domestic pipe systems include polybutylene, polypropylene, and cross-linked polyethylene ("PEX"). Polybutylene can be a very expensive material, while polypropylene can have less hydrostatic resistance at higher temperatures. PEX is also not without its disadvantages. Crosslinking can generate significantly higher costs than in thermoplastic pipe extrusion without crosslinking, and crosslinking can be difficult to control to achieve the proper crosslinking levels. Finally, PEX pipes cannot be welded together to form a piping system. Industry pipe systems mostly use polyethylene and polypropylene; however, when the pipe systems are exposed to higher temperatures and/or higher pressure, the pipe systems may degrade and burst or crack due to lower hydrostatic strength. Additional materials that may be used in domestic and industry pipe systems can include polyethylenes of raised temperature resistance ("PE-RT"), which are a class of polyethylene materials for high temperature and high pressure applications. These polyethylene materials are classified as PE-RT type 0, PE-RT type I or PE-RT type II based on their temperature and pressure resistance. The higher the type number the better may be the temperature and pressure resistance. Thus, in some applications, where higher pressure ratings are required, the PE-RT resins do not work due to less hydrostatic resistance at lower temperatures.

Beside hydrostatic strength, slow crack growth resistance is also important property for pipe applications as slowly developed micro cracks can also cause pipe failure. Slow crack growth resistance may be measured by the Pennsylvania Notch Test, or PENT in short. In general, a minimum of 500 hours of PENT is desired for most pipe applications.

Another important aspect of using polyethylene in pipe applications is the material's processability. In general, polyethylene materials with a low molecular weight (high melt index) and a low melt viscosity are easier to process, especially, for small diameter domestic and industry pipes, where high line speed is preferred to increase production rate. However, these resins do not meet the hydrostatic strength requirements at both room and elevated temperatures, as well as slow crack growth resistance. In order to meet these requirements, a very high molecular weight (low MI) and a bimodal molecular weight distribution may often be required. As a consequence, the resulting materials can be hard to process, especially for small diameter domestic and industry pipe, where high line speed is required.

Accordingly, it is desired to provide polyethylene pipe resins that have improved hydrostatic strength at higher temperatures and high pressure, as well as excellent slow crack growth resistance and improved processability.

SUMMARY

Disclosed in embodiments herein are pipes. The pipes are fabricated from an ethylene/alpha-olefin copolymer composition having a density from 0.935 to 0.955 g/cc; a ratio of weight average molecular weight to number average molecular weight, Mw/Mn, of from 3 to 10; a z-average molecular weight, Mz, of from 200 kg/mol to 500 kg/mol; and a PENT value determined according to ASTM F1473-13 of greater than 500 hours at 80° C. and 2.4 MPa; wherein the pipe has a pipe hydrostatic strength, determined according to ISO 1167, of greater than 100 hours at 20° C. and 12.0 MPa as specified in EN 12201-2.

Further disclosed in embodiments herein are ethylene/alpha-olefin copolymer compositions suitable for pipe applications. The ethylene/alpha-olefin copolymer composition has a density from 0.935 to 0.955 g/cc; a ratio of weight average molecular weight to number average molecular weight, Mw/Mn, of from 3 to 10; a z-average molecular weight, Mz, of from 200 kg/mol to 500 kg/mol; a PENT value determined according to ASTM F1473-13 of greater than 500 hours at 80° C. and 2.4 MPa; wherein when the composition is formed into a monolayer pipe, the pipe has a pipe hydrostatic strength, determined according to ISO 1167, of greater than 100 hours at 20° C. and 12.0 MPa as specified in EN 12201-2.

Additional features and advantages of the embodiments will be set forth in the detailed description which follows, and in part will be readily apparent to those skilled in the art from that description or recognized by practicing the embodiments described herein, including the detailed description which follows and the claims. It is to be understood that both the foregoing and the following description describe various embodiments and are intended to provide an overview or framework for understanding the nature and character of the claimed subject matter.

DETAILED DESCRIPTION

Reference will now be made in detail to embodiments of an ethylene/alpha-olefin copolymer composition and articles comprising the same. The ethylene/alpha-olefin copolymer composition may be used to form pipes, such as, pressure pipes, or pipe fittings. It is noted, however, that this is merely an illustrative implementation of the embodiments described herein. The embodiments are applicable to other technologies that are susceptible to similar problems as those discussed above. For example, the polyethylene compositions described herein may be used in, for example, domestic piping systems (e.g., pipes used for transporting hot and/or cold water in pressurized heating and drinking water networks within buildings, as well as, pipes for snow melt or heat recovery systems) or high temperature resistant geomembranes.

Disclosed in embodiments herein is an ethylene/alpha-olefin copolymer composition that is suitable for pipe or pipe fitting applications. The ethylene/alpha-olefin copolymer composition has: a) a density from 0.935 to 0.955 g/cc; b) a molecular weight ratio, Mw/Mn, of from 3 to 10; c) a z-average molecular weight, Mz, from 200 kg/mol to 500 kg/mol; and d) a PENT value determined according to ASTM F1473-13 of greater than 500 hours at 80° C. and 2.4 MPa; wherein when the composition is formed into a monolayer pipe, the pipe has a pipe hydrostatic strength, determined according to ISO 1167, of greater than 100 hours at 20° C. and 12.0 MPa as specified in EN 12201-2.

In embodiments herein, the ethylene/alpha-olefin copolymer composition can exhibit a density from 0.935 to 0.955 g/cc. All individual values and subranges from 0.935 to 0.955 g/cc are included and disclosed herein; for example, the density can range from a lower limit of 0.935, 0.937, 0.940, 0.942, 0.945, 0.947, or 0.950 g/cc to an upper limit of 0.937, 0.942, 0.947, 0.952 or 0.955 g/cc. For example, the density of the ethylene/alpha-olefin copolymer composition may be from 0.935 to 0.955 g/cc, or in the alternative, from 0.935 to 0.945 g/cc, or in the alternative, from 0.945 to 0.955 g/cc, or in the alternative, from 0.940 to 0.952 g/cc, or in the alternative, from 0.940 to 0.950 g/cc, or in the alternative, from 0.943 to 0.948 g/cc.

In embodiments herein, the ethylene/alpha-olefin copolymer composition may exhibit a ratio of weight average molecular weight to number average molecular weight, Mw/Mn, of from 3 to 10. Mw is the weight average molecular weight and Mn is the number average molecular weight. All individual values and subranges from 3 to 10 are included and disclosed herein; for example, in some embodiments, the Mw/Mn may range from a lower limit of 3, 5, 7 or 9 to an upper limit of 4, 6, 8 or 10. In other embodiments, the Mw/Mn can be from 3 to 9, or in the alternative, from 3 to 6, or in the alternative, from 6 to 10, or in the alternative, from 5 to 8, or in the alternative, from 3 to 5.

In embodiments herein, the ethylene/alpha-olefin copolymer composition may exhibit a z-average molecular weight, Mz, from 200 kg/mol to 500 kg/mol. All individual values from 200 to 500 kg/mole are included and disclosed herein. For example, in some embodiments, the Mz may range from a lower limit of 200, 300, or 400 kg/mol to an upper limit of 250, 350, 450 or 500 kg/mole. In other embodiments, the Mz of the ethylene/alpha-olefin copolymer composition can be from 200 to 450 kg/mole, or in the alternative, from 200 to 350 kg/mole, or in the alternative, from 350 to 500 kg/mole, or in the alternative, from 300 to 450 kg/mole.

In embodiments herein, the ethylene/alpha-olefin copolymer composition can exhibit a PENT value determined according to ASTM F1473-13 of greater than 500 hours at 80° C. and 2.4 MPa. All individual values and subranges from greater than 500 hours are included and disclosed herein. For example, in some embodiments, the ethylene/alpha-olefin copolymer composition can exhibit a PENT value determined according to ASTM F1473-13 at 80° C. and 2.4 MPa of greater than 550 hours, or in the alternative, greater than 600 hours, or in the alternative, greater than 700 hours, or in the alternative, greater than 800 hours, or in the alternative, greater than 900 hours, or in the alternative, greater than 1,000 hours, or in the alternative, greater than 1,200 hours, or in the alternative, greater than 1,500 hours.

In one or more embodiments herein, the ethylene/alpha-olefin copolymer composition may further exhibit a zero shear viscosity ratio, ZSVR, of from 1.5 to 20. All individual values and subranges from 1.5 to 20 are included and disclosed herein. For example, in some embodiments, the ethylene/alpha-olefin copolymer composition can exhibit a zero shear viscosity ratio, ZSVR, of from 1.5 to 15, 1.5 to 10, or 1.5 to 5. The zero shear viscosity ratio may be determined using the creep zero shear viscosity measurement method described herein.

In one or more embodiments herein, the ethylene/alpha-olefin copolymer composition may further exhibit a dynamic viscosity ($\eta^*$) at 100 rad/sec and 190° C. of less than 2,000 Pa·s. All individual values and subranges from less than 2,000 Pa·s are included and disclosed herein. For example, the DMS viscosity at 100 rad/sec can be less than 1,750 Pa·s, or in the alternative, less than 1500 Pa·s, or in the alternative, less than 1,250 Pa·s, or in the alternative, less than 1,000 Pa·s. The dynamic viscosity may be measured using dynamic mechanical spectroscopy.

In one or more embodiments herein, the ethylene/alpha-olefin copolymer composition may further exhibit a dynamic viscosity ($\eta^*$) at 0.1 rads and 190° C. from 10,000 to 70,000 Pa·s. All individual values and subranges from 10,000 to 70,0000 Pa·s are included and disclosed herein; for example, $\eta^*$ at 0.1 rads and 190° C. can range from a lower limit of 10,000, 20,000, 30,000, 40,000, 50,000 or 60,000 Pa·s to an upper limit of 15,000, 25,000, 35,000, 45,000, 55,000, 65,000 or 70,000 Pa·s. For example, $\eta^*$ at 0.1 rads and 190° C. from 10,000 to 70,000 Pa·s, or in the alternative, from 10,000 to 40,000 Pa·s, or in the alternative, from 40,000 to 70,000 Pa·s, or in the alternative, from 12,000 to 20,000 Pa·s. The dynamic viscosity may be measured using dynamic mechanical spectroscopy.

In one or more embodiments herein, when the ethylene/alpha-olefin copolymer composition is formed into a monolayer pipe, the pipe has a pipe hydrostatic strength, determined according to ISO 1167, of greater than 100 hours at 20° C. and 12.0 MPa as specified in EN 12201-2. In one or more embodiments herein, a pipe fabricated from the ethylene/alpha-olefin copolymer composition described herein has a pipe hydrostatic strength, determined according to ISO 1167, of greater than 100 hours at 20° C. and 12.0 MPa as specified in EN 12201-2. All individual values and subranges of greater than 100 hours are included and disclosed herein. For example, in some embodiments, the pipe hydrostatic strength, determined according to ISO 1167, is greater than 125 hours at 20° C. and 12.0 MPa as specified in EN 12201-2, greater than 150 hours, greater than 175 hours, greater than 200 hours, or greater than 225 hours.

In one or more embodiments herein, when the ethylene/alpha-olefin copolymer composition is formed into a monolayer pipe, the pipe has a pipe hydrostatic strength, determined according to ISO 1167, of at least 1,000 hours at 95° C. and 3.6 MPa as specified in ISO 22391-2. In one or more embodiments herein, a pipe fabricated from the ethylene/alpha-olefin copolymer composition described herein has a pipe hydrostatic strength, determined according to ISO 1167, of at least 1,000 hours at 95° C. and 3.6 MPa as specified in ISO 22391-2. All individual values from equal to or greater than 1,000 hours are included and disclosed herein. For example, the pipe hydrostatic strength, determined according to ISO 1167, is at least 1,100 hours at 95° C. and 3.6 MPa as specified in ISO 22391-2, at least 1,200 hours, at least 1,250 hours, at least 1,300 hours, at least 1,350 hours, at least 1,400 hours, at least 1,450 hours, or at least 1,500 hours.

In one or more embodiments herein, the ethylene/alpha-olefin copolymer composition may comprise a first component and a second component, wherein the first component is a homogeneously branched ethylene/alpha-olefin copolymer, and the second component is an ethylene homopolymer, a homogeneously branched ethylene/alpha-olefin copolymer, or a heterogeneously branched ethylene/alpha-olefin copolymer. In some embodiments, the ethylene/alpha-olefin copolymer composition may comprise a first component and a second component, wherein the first component is a homogeneously branched ethylene/alpha-olefin copolymer, and the second component is a homogeneously branched ethylene/alpha-olefin copolymer.

In some embodiments, the ethylene/alpha-olefin copolymer composition comprises from 30 to 70 wt. % of a first component and from 30 to 70 wt. % of a second component. All individual values and subranges from 30 to 70 wt. % of the first component are included and disclosed herein; for example, the amount of the first component can range from a lower limit of 30, 40, 50 or 60 wt. % to an upper limit of 35, 45, 55, 65 or 70 wt. %. For example, the amount of the first component in the composition can be from 30 to 70 wt. %, or in the alternative, from 30 to 50 wt. %, or in the alternative, from 50 to 70 wt. %, or in the alternative, from 40 to 60 wt. %. Likewise, all individual values and subranges from 30 to 70 wt. % of the second component in the composition are also included and disclosed herein; for example, the amount of the second component can range from a lower limit of 30, 40, 50 or 60 wt. % to an upper limit of 35, 45, 55, 65 or 70 wt. %. For example, the amount of the second component in the composition can be from 30 to 70 wt. %, or in the alternative, from 30 to 50 wt. %, or in the alternative, from 50 to 70 wt. %, or in the alternative, from 40 to 60 wt. %.

When the first and second components are present in the composition, the first component may, in certain embodiments, have a density of from 0.915 to 0.935 g/cc. All individual values and subranges from 0.915 to 0.935 g/cc are included and disclosed herein; for example, the density of the first component can range from a lower limit of 0.915, 0.920, 0.925, or 0.930 g/cc to an upper limit of 0.918, 0.923, 0.928, 0.931, or 0.935 g/cc. For example, the density of the first component may be from 0.915 to 0.9220 g/cc, or in the alternative, from 0.921 to 0.935 g/cc, or in the alternative, from 0.915 to 0.923 g/cc, or in the alternative, from 0.924 to 0.928 g/cc.

When the first and second components are present in the composition, the first component may, in certain embodiments, have a melt index, $I_2$, from 0.01 to 0.5 g/10 min. All individual values and subranges from 0.01 to 0.5 g/10 min are included and disclosed herein; for example, the $I_2$ of the first component range from a lower limit of 0.01, 0.05, 0.1, 0.2, 0.3 or 0.4 g/10 min to an upper limit of 0.02, 0.08, 0.15, 0.25, 0.35, 0.45, or 0.5 g/10 min. For example, the $I_2$ of the first component can be from 0.01 to 0.5 g/10 min, or in the alternative, from 0.01 to 0.1 g/10 min, or in the alternative, from 0.25 to 0.5 g/10 min, or in the alternative, from 0.03 to 0.1 g/10 min.

When the first and second components are present in the composition, the second component may have a density of from 0.940 to 0.970 g/cc. All individual values and subranges from 0.940 to 0.970 g/cc are included and disclosed herein; for example, when the first and second components are present in the composition, the second component may have a density ranging from a lower limit of 0.940, 0.945, 0.950, 0.955, 0.960, or 0.965 g/cc to an upper limit of 0.942, 0.948, 0.953, 0.957, 0.962, or 0.970 g/cc. For example, when the first and second components are present in the composition, the second component may have density can be from 0.940 to 0.970 g/cc, or in the alternative, from 0.940 to 0.955 g/cc, or in the alternative, from 0.950 to 0.965 g/cc, or in the alternative, from 0.955 to 0.970 g/cc. The density of the second component may be calculated from the following equation (I):

$$\frac{1}{\text{Density }(PE)} = \frac{\text{Weight Fraction }(A)}{\text{Density }(A)} + \frac{\text{Weight Fraction }(B)}{\text{Density }(B)} \quad (I)$$

wherein "A" is the first component, "B" is the second component, and "PE" is the ethylene/alpha-olefin copolymer composition.

The ethylene/alpha-olefin copolymer composition may further comprise additional components such as one or more additives. Such additives include, but are not limited to, antistatic agents, color enhancers, dyes, lubricants, fillers such as $TiO_2$ or $CaCO_3$, opacifiers, nucleators, pigments, primary anti-oxidants, secondary anti-oxidants, processing aids, UV stabilizers, anti-blocks, slip agents, tackifiers, metal scavengers, fire retardants, anti-microbial agents, odor reducer agents, anti-fungal agents, and combinations thereof. The ethylene/alpha-olefin copolymer composition may contain from about 0.1 to about 10 percent by the combined weight of such additives, based on the weight of the ethylene/alpha-olefin copolymer composition including such additives.

Any conventional polymerization processes may be employed to produce the ethylene/alpha-olefin copolymer composition. Such conventional polymerization processes include, but are not limited to, slurry polymerization processes, solution polymerization process, using one or more conventional reactors e.g. loop reactors, isothermal reactors, stirred tank reactors, batch reactors in parallel, series, and/or any combinations thereof. The ethylene/alpha-olefin copolymer composition may, for example, be produced via solution phase polymerization process using one or more loop reactors, isothermal reactors, and combinations thereof.

In general, the solution phase polymerization process occurs in one or more well-mixed reactors such as one or more isothermal loop reactors or one or more adiabatic reactors at a temperature in the range of from 115 to 250° C.; for example, from 115 to 200° C., and at pressures in the range of from 300 to 1,000 psi; for example, from 400 to 750 psi. In some embodiments, in a dual reactor, the temperature in the first reactor is in the range of from 115 to 190° C., for example, from 115 to 175° C., and the second reactor temperature is in the range of 150 to 250° C., for example, from 130 to 165° C. In other embodiments, in a single reactor, the temperature in the reactor is in the range of from 115 to 250° C., for example, from 115 to 225° C.

The residence time in solution phase polymerization process may be in the range of from 2 to 30 minutes; for example, from 10 to 20 minutes. Ethylene, solvent, hydrogen, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Tex. The resultant mixture of the ethylene/alpha-olefin copolymer and solvent is then removed from the reactor and the ethylene/alpha-olefin copolymer is isolated. Solvent is typically recovered via a solvent recovery unit, i.e. heat exchangers and vapor liquid separator drum, and is then recycled back into the polymerization system.

In one embodiment, the ethylene/alpha-olefin copolymer composition may be produced via solution polymerization in a dual reactor system, for example a dual loop reactor system, wherein ethylene and optionally one or more alpha-olefins are polymerized in the presence of one or more catalyst systems. Additionally, one or more cocatalysts may be present. In another embodiment, the ethylene/alpha-olefin dcopolymers may be produced via solution polymerization in a single reactor system, for example a single loop reactor system, wherein ethylene and optionally one or more alpha-olefins are polymerized in the presence of two catalyst systems.

A first exemplary catalyst system suitable for producing the first ethylene/alpha-olefin copolymer can be a catalyst system comprising a procatalyst component comprising a metal-ligand complex of formula (IA):

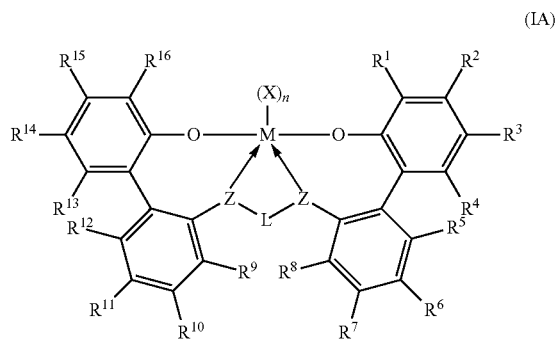

(IA)

wherein:

M is titanium, zirconium, or hafnium, each independently being in a formal oxidation state of 5+2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (IA) is, overall, neutral; and each Z independently is O, S, N(C1-C40)hydrocarbyl, or P(C1-C40)hydrocarbyl; and the Z-L-Z fragment is comprised of formula (II):

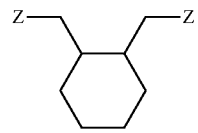

(II)

$R^{1-16}$ are selected from the group consisting of a $(C_1-C_{40})$ hydrocarbyl, $(C\ C_1-C_{40})$heterohydrocarbyl, $Si(R^C)_3$, $Ge(R^C)_3$, $P(R^P)_2$, $N(R^N)_2$, $OR^C$, $SR^C$, $NO_2$, $CN$, $CF_3$, $R^CS(O)—$, $R^CS(O)_2—$, $(R^C)_2C=N—$, $R^CC(O)O—$, $R^COC(O)—$, $R^CC(O)N(R)—$, $(R^C)_2NC(O)—$, halogen atom, hydrogen atom, and combinations thereof.

Optionally two or more R groups (from $R^{9-13}$ or $R^{4-8}$) can combine together into ring structures, with such ring structures having from 3 to 50 atoms in the ring excluding any hydrogen atoms.

Each of the aryl, heteroaryl, hydrocarbyl, heterohydrocarbyl, $Si(R^C)_3$, $Ge(R^C)_3$, $P(R^P)_2$, $N(R^N)_2$, $OR^C$, $SR^C$, $R^CS(O)—$, $R^CS(O)_2—$, $(R^C)_2C=N—$, $R^CC(O)O—$, $R^COC(O)—$, $R^CC(O)N(R)—$, $(R^C)_2NC(O)—$, hydrocarbylene, and heterohydrocarbylene groups independently is unsubstituted or substituted with one or more RS substituents; and each RS independently is a halogen atom, polyfluoro substitution, perfluoro substitution, unsubstituted $(C_1-C_{18})$alkyl, $F_3C—$, $FCH_2O—$, $F_2HCO—$, $F_3CO—$, $R_3Si—$, $R_3Ge—$, $RO—$, $RS—$, $RS(O)—$, $RS(O)_2—$, $R_2P—$, $R_2N—$, $R_2C=N—$, $NC—$, $RC(O)O—$, $ROC(O)—$, $RC(O)N(R)—$, or $R_2NC(O)—$, or two of the RS are taken together to form an unsubstituted $(C_1-C_{18})$alkylene, wherein each R independently is an unsubstituted $(C_1-C_{18})$alkyl.

In one embodiment, the catalyst system suitable for producing the first ethylene/alpha-olefin interpolymer can be a catalyst system comprising bis((2-oxoyl-3-(dibenzo-1H-pyrrole-1-yl)-5-(methyl)phenyl)-2-phenoxymethyl)-methylene-1,2-cyclohexanediylhafnium (IV) dimethyl, represented by the following formula (Catalyst Formula 1):

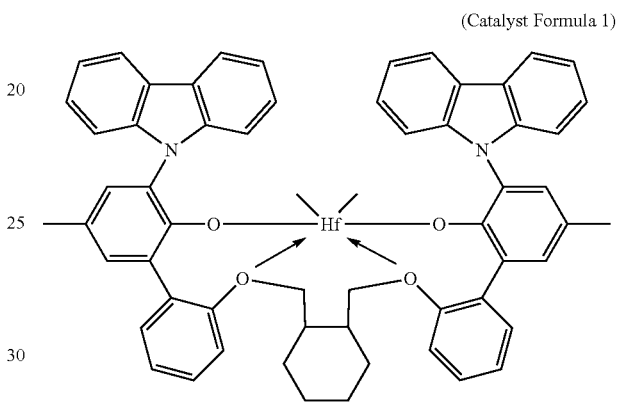

(Catalyst Formula 1)

An exemplary second catalyst system can be a catalyst system comprising a procatalyst component comprising a metal ligand complex of formula (IB):

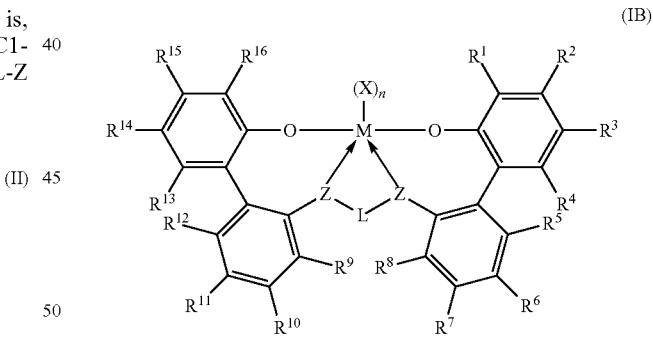

(IB)

wherein: M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (IB) is, overall, neutral; and each Z independently is O, S, N(C$_1$-C$_{40}$)hydrocarbyl, or P(C$_1$-C$_{40}$)hydrocarbyl; and L is (C$_3$-C$_{40}$)hydrocarbylene or (C$_3$-C$_{40}$)heterohydrocarbylene, wherein the (C$_3$-C$_{40}$)hydrocarbylene has a portion that comprises a 3-carbon atom to -carbon atom linker backbone linking the Z atoms in formula (IB) (to which L is bonded) and the (C$_3$-C$_{40}$)heterohydrocarbylene has a portion that comprises a 3-atom to 10-atom linker backbone linking the Z atoms in formula (IB), wherein each of the from 3 to 10 atoms of the 3-atom to 10-atom linker backbone of the $(C_3-C_{40})$heterohydrocarbylene independently is a carbon atom or heteroatom, wherein each heteroatom independently is O, S, S(O), S(O)$_2$, Si(R$^C$)$_2$, Ge(R$^C$)$_2$, P(R$^P$), or N(R$^N$), wherein independently each R$^C$ is $(C_1-C_{30})$hydrocarbyl, each R$^P$ is $(C_1-C_{30})$hydrocarbyl; and each R$^N$ is $(C_1-C_{30})$ hydrocarbyl or absent; and R$^1$, R$^{16}$, or both comprise of formula (III) and preferably R$^1$ and R$^{16}$ are the same; and

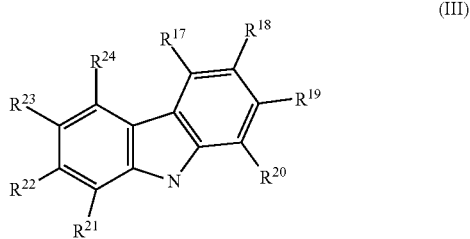

(III)

$R^{1-24}$ are selected from the group consiting of a $(C_1-C_{40})$ hydrocarbyl, $(C_1-C_{40})$heterohydrocarbyl, Si(R$^C$)$_3$, Ge(R$^C$)$_3$, P(R$^P$)$_2$, N(R$^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O)O—, R$^C$OC(O)—, R$^C$C (O)N(R)—, (R$^C$)$_2$NC(O)—, halogen atom, hydrogen atom, and combination thereof.

When R$^{22}$ is H, then R$^{19}$ is a $(C_1-C_{40})$hydrocarbyl; $(C_1-C_{40})$heterohydrocarbyl; Si(R$^C$)$_3$, Ge(R$^C$)$_3$, P(R$^P$)$_2$, N(R$^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, or halogen atom; and When R$^{19}$ is H, then R$^{22}$ is a $(C_1-C_{40})$hydrocarbyl; $(C_1-C_{40})$heterohydrocarbyl; Si(R$^C$)$_3$, Ge(R$^C$)$_3$, P(R$^P$)$_2$, N(R$^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, or halogen atom; and preferably, R$^{22}$ and R$^{19}$ are both a $(C_1-C_{40})$hydrocarbyl; $(C_1-C_{40})$heterohydrocarbyl; Si(R$^C$)$_3$, Ge(R$^C$)$_3$, P(R$^P$)$_2$, N(R$^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, or halogen atom; and When R$^8$ is H, then R$^9$ is a $(C_1-C_{40})$hydrocarbyl; $(C_1-C_{40})$heterohydrocarbyl; Si(R$^C$)$_3$, Ge(R$^C$)$_3$, P(R$^P$)$_2$, N(R$^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, or halogen atom; and When R$^9$ is H, then R$^8$ is $(C_1-C_{40})$hydrocarbyl; $(C_1-C_{40})$heterohydrocarbyl; Si(R$^C$)$_3$, Ge(R$^C$)$_3$, P(R$^P$)$_2$, N(R$^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, or halogen atom; and Preferably, R$^8$ and R$^9$ are both a $(C_1-C_{40})$hydrocarbyl; $(C_1-C_{40})$heterohydrocarbyl; Si(R$^C$)$_3$, Ge(R$^C$)$_3$, P(R$^P$)$_2$, N(R$^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, or halogen atom; and Optionally two or more R groups (from R$^{9-13}$ or R$^{4-8}$) can combine together into ring structures, with such ring structures having from 3 to 50 atoms in the ring excluding any hydrogen atoms.

Each of the aryl, heteroaryl, hydrocarbyl, heterohydrocarbyl, Si(R$^C$)$_3$, Ge(R$^C$)$_3$, P(R$^P$)$_2$, N(R$^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O) O—, R$^C$OC(O)—, R$^C$C(O)N(R)—, (R$^C$)$_2$NC(O)—, hydrocarbylene, and heterohydrocarbylene groups independently is unsubstituted or substituted with one or more R$^S$ substituents; and Each R$^S$ independently is a halogen atom, polyfluoro substitution, perfluoro substitution, unsubstituted $(C_1-C_{18})$ alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the R$^S$ are taken together to form an unsubstituted $(C_1-C_{18})$alkylene, wherein each R independently is an unsubstituted $(C_1-C_{18})$alkyl.

Optionally two or more R groups (from R$^{20-24}$) can conbine together into ring structures, with such ring structures having from 3 to 50 atoms in the ring excluding any hydrogen atoms.

In one embodiment, the second catalyst system can be a catalyst system comprising ((3-(2,7-di-tert-butyl-9H-carbazol-9-yl)-2'-(3-((3'-(2,7-di-tert-butyl-9H-carbazol-9-yl)-5-fluoro-2'-hydroxy-3-methyl-5'-(2,4,4-trimethylpentan-2-yl)-[1,1'-biphenyl]-2-yl)oxy)propoxy)-5'-fluoro-3'-methyl-5-(2,4,4-trimethylpentan-2-yl)-[1,1'-biphenyl]-2-yl)oxy) hafnium (IV) dimethyl, represented by the following formula (Catalyst Formula 2):

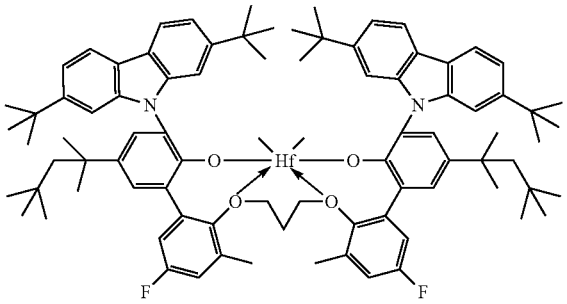

(Catalyst Formula 2)

The above described catalyst systems can be rendered catalytically active by contacting it to, or combining it with, the activating co-catalyst or by using an activating technique such as those that are known in the art for use with metal-based olefin polymerization reactions. Suitable activating co-catalysts for use herein include alkyl aluminums; polymeric or oligomeric alumoxanes (also known as aluminoxanes); neutral Lewis acids; and non-polymeric, noncoordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657.

Examples of preferred polymeric or oligomeric alumoxanes are methylalumoxane, triisobutylaluminum-modified methylalumoxane, and isobutylalumoxane. Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri(($C_1$-$C_{10}$)alkyl)aluminum or tri (($C_6$-$C_{18}$)aryl)boron compounds and halogenated (including perhalogenated) derivatives thereof. In some other embodiments, exemplary Group 13 metal compounds are tris (fluoro-substituted phenyl)boranes, in other embodiments, tris(pentafluorophenyl)borane. In some embodiments, the activating co-catalyst is a tris(($C_1$-$C_{20}$)hydrocarbyl) borate (e.g., trityl tetrafluoroborate) or a tri(($C_1$-$C_{20}$)hydrocarbyl)ammonium tetra(($C_1$-$C_{20}$)hydrocarbyl)borane (e.g., bis (octadecyl)methylammonium tetrakis(pentafluorophenyl) borane). As used herein, the term "ammonium" means a nitrogen cation that is a (($C_1$-$C_{20}$)hydrocarbyl)$_4$N$^+$, a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl may be the same or different.

Exemplary combinations of neutral Lewis acid activating co-catalysts include mixtures comprising a combination of a tri(($C_1$-$C_4$)alkyl)aluminum and a halogenated tri(($C_6$-$C_{18}$) aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluorophenylborane): (alumoxane) [e.g., (Group 4 metal-ligand complex):(tris(pentafluorophenylborane):(alumoxane)] are from 1:1:1 to 1:10:30, other exemplary embodiments are from 1:1:1.5 to 1:5:10.

Many activating co-catalysts and activating techniques have been previously taught with respect to different metal-ligand complexes in the following USPNs, which are incorporated herein by reference: U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907.

Examples of suitable hydrocarbyloxides are disclosed in U.S. Pat. No. 5,296,433, which is incorporated herein by reference. Examples of suitable Bronsted acid salts for addition polymerization catalysts are disclosed in U.S. Pat. Nos. 5,064,802; 5,919,983; 5,783,512, which are incorporated herein by reference. Examples of suitable salts of a cationic oxidizing agent and a noncoordinating, compatible anion as activating co-catalysts for addition polymerization catalysts are disclosed in U.S. Pat. No. 5,321,106, which is incorporated herein by reference. Examples of suitable carbenium salts as activating co-catalysts for addition polymerization catalysts are disclosed in U.S. Pat. No. 5,350,723, which is incorporated herein by reference. Examples of suitable silylium salts as activating co-catalysts for addition polymerization catalysts are disclosed in U.S. Pat. No. 5,625,087, which is incorporated herein by reference. Examples of suitable complexes of alcohols, mercaptans, silanols, and oximes with tris(pentafluorophenyl)borane are disclosed in U.S. Pat. No. 5,296,433, which is incorporated herein by reference. Some of these catalysts are also described in a portion of U.S. Pat. No. 6,515,155 B1 beginning at column 50, at line 39, and going through column 56, at line 55, only the portion of which is incorporated by reference herein.

In some embodiments, the above described catalyst systems can be activated to form an active catalyst composition by combination with one or more cocatalyst such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis(pentafluorophenyl)borate(1-) amine, triethyl aluminum (TEA), and any combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl) borane, or an ammonium borate with an oligomeric or polymeric alumoxane compound.

Also disclosed herein is an article comprising any embodiment of the ethylene/alpha-olefin copolymer composition disclosed herein. In one embodiment, the article is a pipe fabricated from an ethylene/alpha-olefin copolymer composition having: a) a density from 0.935 to 0.955 g/cc; b) a ratio of weight average molecular weight to number average molecular weight, Mw/Mn, of from 3 to 10; c) a z-average molecular weight, Mz, of from 200 kg/mol to 500 kg/mol; and d) a PENT value determined according to ASTM F1473-13 of greater than 500 hours at 80° C. and 2.4 MPa; wherein the pipe has a pipe hydrostatic strength, determined according to ISO 1167, of greater than 100 hours at 20° C. and 12.0 MPa as specified in EN 12201-2. In another embodiment, the article is a pipe fitting fabricated from an ethylene/alpha-olefin copolymer composition having: a) a density from 0.935 to 0.955 g/cc; b) a ratio of weight average molecular weight to number average molecular weight, Mw/Mn, of from 3 to 10; c) a z-average molecular weight, Mz, of from 200 kg/mol to 500 kg/mol; and d) a PENT value determined according to ASTM F1473-13 of greater than 500 hours at 80° C. and 2.4 MPa; wherein when the composition is formed into a monolayer pipe, the pipe has a pipe hydrostatic strength, determined according to ISO 1167, of greater than 100 hours at 20° C. and 12.0 MPa as specified in EN 12201-2.

In some embodiments herein, the pipe may further exhibit a pipe hydrostatic strength, determined according to ISO 1167, of greater than 125 hours at 20° C. and 12.0 MPa as specified in EN 12201-2, greater than 150 hours, greater than 175 hours, greater than 200 hours, or greater than 225 hours. Of course, all individual values and subranges of greater than 100 hours are included and disclosed herein. In one or more embodiments herein, the pipe may further exhibit a pipe hydrostatic strength, determined according to ISO 1167, of at least 1,000 hours at 95° C. and 3.6 MPa as specified in ISO 22391-2. All individual values from equal to or greater than 1,000 hours are included and disclosed herein. For example, the pipe may exhibit a pipe hydrostatic strength, determined according to ISO 1167, of at least 1,100 hours at 95° C. and 3.6 MPa as specified in ISO 22391-2, at least 1,200 hours, at least 1,250 hours, at least 1,300 hours, at least 1,350 hours, at least 1,400 hours, at least 1,450 hours, or at least 1,500 hours.

EXAMPLES

The following examples illustrate the present invention but are not intended to limit the scope of the invention.

Production of Inventive Example

Inventive Example 1 (IE-1) is prepared according to the following process in a dual reactor configuration according to the conditions reported in Table 1.

All raw materials (monomer and comonomer) and the process solvent (a narrow boiling range high-purity paraffinic and cycloparaffinic solvent) are purified with molecular sieves before introduction into the reaction environment. High purity hydrogen is supplied by shared pipeline and dried with molecular sieve. The reactor monomer feed stream is pressurized via a mechanical compressor to above reaction pressure. The solvent feed is pressurized via a pump to a pressure higher than the reaction pressure. The comonomer feed is pressurized via a pump to higher than reaction pressure. The individual catalyst components are manually batch diluted to specified component concentrations with purified solvent and pressured to above reaction pressure. All reaction feed flows are measured with mass flow meters and independently controlled with metering pumps.

The comonomer feed is mechanically pressurized and can be injected into the process at several potential locations depending on reactor configuration which include: only the feed stream for the first reactor, only the feed stream for the second reactor, or both the first and second reactor feed streams independently. Some comonomer injection combinations are only possible when running dual reactor configuration.

Reactor configuration options include single reactor operation, dual series reactor operation, or dual parallel reactor operation.

The continuous solution polymerization reactor consists of a liquid full, adiabatic, and continuously stirred tank reactor (CSTR). Independent control of all solvent, monomer, comonomer, hydrogen, and catalyst component feeds is possible. The total feed stream to the reactor (solvent, monomer, comonomer, and hydrogen) is temperature controlled by passing the feed stream through a heat exchanger. The total feed to the polymerization reactor is injected into the reactor in one location. The catalyst components are injected into the polymerization reactor separate from the other feeds. An agitator in the reactor is responsible for continuously mixing of the reactants. An oil bath provides for some fine tuning of the reactor temperature control.

In dual series reactor configuration the effluent from the first polymerization reactor exits the first reactor and is added to the second reactor separate from the other feeds to the second reactor.

In dual parallel reactor configuration the effluent streams from the first and the second polymerization reactors are combined prior to any additional processing.

In all reactor configurations the final reactor effluent (second reactor effluent for dual series, the combined effluent for dual parallel, or the single reactor effluent) enters a zone where it is deactivated with the addition of and reaction with a suitable reagent (typically water). At this same reactor exit location other additives may also be added.

Following catalyst deactivation and any additive addition, the reactor effluent enters a devolatization system where the polymer is removed from the non-polymer stream. The non-polymer stream is removed from the system. The isolated polymer melt is pelletized and collected.

TABLE 1

| Parameter | Unit | IE-1 |
|---|---|---|
| Reactor Configuration | Descriptor | Dual-Parallel |
| Primary Reactor Solvent Feed Flow | kg/hr | 27.3 |
| Primary Reactor Ethylene Feed Flow | kg/hr | 2.5 |
| Primary Reactor Hydrogen Feed Flow | mL/min | 410 |
| Primary Reactor 1-Octene Feed Flow | kg/hr | 0.2 |
| Primary Reactor Feed Temperature | °C. | 5 |
| Primary Reactor Temperature | °C. | 140 |
| Primary Reactor Oil Bath Temperature | °C. | 168 |
| Primary Reactor Primary Catalyst Type | type | Catalyst-Formula 1 (see above) |
| Primary Reactor Primary Catalyst Feed Concentration | mmol/kg | 0.1 |
| Primary Reactor Primary Catalyst Feed Flow | g/hr | 69 |
| Primary Reactor CoCatalyst Type | type | bis(hydrogenated tallow alkyl) methyl, tetrakis(pentafluorophenyl)borate(1-) amine |
| Primary Reactor CoCatalyst Feed Concentration | mmol/kg | 0.12 |
| Primary Reactor CoCatalyst Feed Flow | g/hr | 69 |
| Primary Reactor CoCatalyst 2 Type | type | MMAO |
| Primary Reactor CoCatalyst 2 Feed Concentration | mmol/kg | 3 |
| Primary Reactor CoCatalyst 2 Feed Flow | g/hr | 200 |
| Primary Reactor Ethylene Concentration | g/L | 15 |
| Primary Reactor Viscosity | cPa | 274 |
| Secondary Reactor Solvent Feed Flow | kg/hr | 10.2 |
| Secondary Reactor Ethylene Feed Flow | kg/hr | 2.3 |
| Secondary Reactor Hydrogen Feed Flow | mL/min | 574 |
| Secondary Reactor 1-Octene Feed Flow | kg/hr | 0.2 |
| Secondary Reactor Feed Temperature | °C. | 0 |
| Secondary Reactor Temperature | °C. | 200 |
| Secondary Reactor Oil Bath Temperature | °C. | 192 |
| Secondary Reactor Primary Catalyst Type | type | Catalyst-Formula 2 (see above) |
| Secondary Reactor Primary Catalyst Feed Concentration | mmol/kg | 0.02 |
| Secondary Reactor Primary Catalyst Feed Flow | g/hr | 18 |
| Secondary Reactor CoCatalyst Type | type | bis(hydrogenated tallow alkyl)methyl, tetrakis(pentafluorophenyl)borate(1-) amine |
| Secondary Reactor CoCatalyst Feed Concentration | mmol/kg | 0.03 |

TABLE 1-continued

| Parameter | Unit | IE-1 |
|---|---|---|
| Secondary Reactor CoCatalyst Feed Flow | g/kg | 18 |
| Secondary Reactor CoCatalyst 2 Type | type | MMAO |
| Secondary Reactor CoCatalyst 2 Feed Concentration | mmol/kg | 3 |
| Secondary Reactor CoCatalyst 2 Feed Flow | g/kg | 38 |
| Secondary Reactor Ethylene Concentration | g/L | 8 |
| Secondary Reactor Viscosity | cPa | 36 |

Comparative Example A is XRT 70, which is commercially available from Total S.A. (Paris, France).

Characterization of Inventive Example and Comparative Example

Inventive Example 1 (IE-1) and Comparative Example A (CE-A) were tested for their properties, and the results are reported in Table 2. Result for slow crack growth resistance measured via the Pennsylvania Notch Test (PENT) at 80° C. and 2.4 MPa and Hydrostatic Strength tests at various temperatures and pressures are listed in Table 3.

TABLE 2

Resin Characterization

| Property | Unit | IE-1 | CE-A |
|---|---|---|---|
| Density | g/cc | 0.946 | 0.947 |
| $I_2$ | g/10 min | 0.49 | 0.17 |
| $I_{10}/I_2$ | | 8.8 | 16.3 |
| ZSVR | | 1.9 | NM |
| Mn (conv) | g/mol | 30,636 | 11,394 |
| Mw (conv) | g/mol | 133,047 | 217,739 |
| Mz (conv) | g/mol | 363,945 | 1,132,135 |
| $\eta^*$ (0.01 rad/s) | Pa · s | 18,544 | 85,161 |
| $\eta^*$ (0.1 rad/s) | Pa · s | 15,823 | 55,134 |
| $\eta^*$ (1.0 rad/s) | Pa · s | 11,717 | 27,038 |
| $\eta^*$ (10 rad/s) | Pa · s | 5,929 | 9,203 |
| $\eta^*$ (100 rad/s) | Pa · s | 1,773 | 2,271 |

TABLE 3

| Test | Unit | IE-1 | CE-A |
|---|---|---|---|
| PENT (80° C., 2.4 MPa) | hours | 1,941 | 856 |
| Hydrostatic Strength (20° C., 12 MPa) | hours | 159 | NM |
| Hydrostatic Strength (95° C., 3.6 MPa) | hours | 5874 | NM |

NM = not measured

Test Methods

Test methods include the following:

Density

Samples for density measurements are prepared according to ASTM D 4703-10. Samples are pressed at 374° F. (190° C.), for five minutes, at 10,000 psi (68 MPa). The temperature is maintained at 374° F. (190° C.) for the above five minutes, and then the pressure is increased to 30,000 psi (207 MPa) for three minutes. This is followed by a one minute hold at 70° F. (21° C.) and 30,000 psi (207 MPa). Measurements are made within one hour of sample pressing using ASTM D792-08, Method B.

Melt Index

Melt index ($I_2$), is measured in accordance with ASTM D 1238-10, Condition 190° C./2.16 kg, Method B, and is reported in grams eluted per 10 minutes.

Melt index ($I_{10}$) is measured in accordance with ASTM D 1238-10, Condition 190° C./10 kg, Method B, and is reported in grams eluted per 10 minutes.

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 µm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rads is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{0B}}{\eta_{0L}} = \frac{\eta_{0B}}{2.29 \times 10^{-15} M_{w-gpc}^{3.65}}$$

The ZSV value is obtained from creep test at 190° C. via the method described above. The Mw-gpc value is determined by the conventional GPC method. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

Dynamic Mechanical Spectroscopy (DMS)

Resins are compression-molded into "3 mm thick×25 mm" circular plaques at 350° F. (° C. for consistency), for five minutes, under 1500 psi pressure, in air. The sample is then taken out of the press, and placed on a counter to cool.

A constant temperature frequency sweep is performed using a TA Instruments "Advanced Rheometric Expansion System (ARES)," equipped with 25 mm (diameter) parallel plates, under a nitrogen purge. The sample is placed on the plate, and allowed to melt for five minutes at 190° C. The plates are then closed to a gap of "2 mm," the sample trimmed (extra sample that extends beyond the circumference of the "25 mm diameter" plate is removed), and then the test is started. The method has an additional five minute delay built in, to allow for temperature equilibrium. The experiments are performed at 190° C. over a frequency range of 0.1 to 100 rad/s. The strain amplitude is constant at 10%.

Gel Permeation Chromatography (GPC)

Samples are analyzed with a high-temperature GPC instrument (model PL220, Polymer Laboratories, Inc., now Agilent). Conventional GPC measurements are used to determine the weight-average molecular weight (Mw) and number-average molecular weight (Mn) of the polymer and to determine the molecular weight distribution, MWD or Mw/Mn. The z-average molecular weight, Mz, is also determined. The method employs the well-known universal calibration method based on the concept of hydrodynamic volume, and the calibration is performed using narrow polystyrene (PS) standards along with three 10 μm Mixed-B columns (Polymer Laboratories Inc, now Agilent) operating at a system temperature of 140° C. Polyethylene samples are prepared at a 2 mg/mL concentration in 1,2,4-trichlorobenzene solvent by slowly stirring the sample in TCB at 160° C. for 4 hours. The flow rate is 1.0 mL/min, and the injection size is 200 microliters. The chromatographic solvent and the sample preparation solvent contained 200 ppm of butylated hydroxytoluene (BHT). Both solvent sources are nitrogen sparged. The molecular weights of the polystyrene standards are converted to polyethylene equivalent molecular weights using a correction factor of 0.4316 as discussed in the literature (T. Williams and I. M. Ward, *Polym. Letters*, 6, 621-624 (1968)). A third order polynomial is used to fit the respective polyethylene-equivalent molecular weights of standards to the observed elution volumes.

Pennsylvania Notch Test (PENT)

The PENT test, a slow crack growth resistance measurement test, is determined according to ASTM F1473-13 at 80° C. and 2.4 MPa applied stress.

Pipe Preparation and Testing

Pipe Extrusion

Pipes were produced on a Cincinnati Proton extruder (45 mm barrier screw of 28 L/D), equipped with a Graewe V63-2-6 cooling unit. Pipes were extruded with a temperature profile of 210-220-230-240° C. in the four zones of the extruder, and at 245° C. at all four die zones The pipes produced via the above method have an outer diameter of 20 mm and a wall thickness of 2 mm.

Hydrostatic Strength Testing

A pipe specimen is prepared according to the test method used is EN ISO 1167. Hydrostatic strength testing is performed on the pipe specimen at 20° C. and at 12 MPa pressure according to the requirements of EN 12201-2; and hydrostatic strength testing is also performed on the pipe specimen at 95° C. and at 3.6 MPa according to the requirements of ISO 22391-2.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A pipe fabricated from an ethylene/alpha-olefin copolymer composition having:
    a) a density from 0.940 to 0.955 g/cc;
    b) a ratio of weight average molecular weight to number average molecular weight, Mw/Mn, of from 3 to 10;
    c) a z-average molecular weight, Mz, of from 200 kg/mol to 400 kg/mol; and
    d) a PENT value determined according to ASTM F1473-13 of greater than 500 hours at 80° C. and 2.4 MPa;
    e) a zero shear viscosity ratio, ZSVR, of from 1.5 to 20;
    wherein the pipe has a pipe hydrostatic strength, determined according to ISO 1167, of greater than 100 hours at 20° C. and 12.0 MPa as specified in EN 12201-2.

2. The pipe of claim 1, wherein the pipe further exhibits a pipe hydrostatic strength, determined according to ISO 1167, of at least 1,000 hours at 95° C. and 3.6 MPa as specified in ISO 22391-2.

3. The pipe of claim 1, wherein the composition further exhibits a dynamic viscosity, $\eta^*$, at 100 rad/sec and 190° C. of less than 2,000 Pa-s.

4. The pipe of claim 1, wherein the composition further exhibits a dynamic viscosity, $\eta^*$, at 0.1 rad/sec and 190° C. from 10,000 to 70,000 Pa-s.

5. The pipe of claim 1, wherein the composition has a density from 0.940 to 0.952 g/cc.

6. The pipe of claim 1, wherein the composition has a ratio of weight average molecular weight to number average molecular weight, Mw/Mn, of from 3 to 6.

7. The pipe of claim 1, wherein the composition has a z-average molecular weight, Mz, of from 300 kg/mol to 400 kg/mol.

8. The pipe of claim 1, wherein the composition has a PENT value of greater than 1,000 hours determined according to ASTM F1473-13 at 80° C. and 2.4 MPa.

9. The pipe of claim 1, wherein the composition has a PENT value of greater than 1,500 hours determined according to ASTM F1473-13 at 80° C. and 2.4 MPa.

10. An ethylene/alpha-olefin copolymer composition suitable for pipe applications, wherein the ethylene/alpha-olefin copolymer composition has:
   a) a density from 0.9400.935 to 0.955 g/cc;
   b) a ratio of weight average molecular weight to number average molecular weight, Mw/Mn, of from 3 to 10;
   c) a z-average molecular weight, Mz, of from 200 kg/mol to 400 kg/mol;
   d) a PENT value determined according to ASTM F1473-13 of greater than 500 hours at 80° C. and 2.4 MPa;
   e) a zero shear viscosity ratio, ZSVR, of from 1.5 to 20;
   wherein when the composition is formed into a monolayer pipe, the pipe has a pipe hydrostatic strength, determined according to ISO 1167, of greater than 100 hours at 20° C. and 12.0 MPa as specified in EN 12201-2.

11. The composition of claim 10, wherein the ethylene/alpha-olefin copolymer composition comprises a first component and a second component, wherein the first component is a homogeneously branched ethylene/alpha-olefin copolymer, and the second component is an ethylene homopolymer, a homogeneously branched ethylene/alpha-olefin copolymer, or a heterogeneously branched ethylene/alpha-olefin copolymer.

12. The composition of claim 10, wherein the ethylene/alpha-olefin copolymer composition comprises a first component and a second component, wherein the first component is a homogeneously branched ethylene/alpha-olefin copolymer, and the second component is a homogeneously branched ethylene/alpha-olefin copolymer.

13. An article formed from the composition of claim 10, wherein the article is a pipe fitting.

* * * * *